(12) United States Patent
Anthony et al.

(10) Patent No.: US 8,511,813 B2
(45) Date of Patent: Aug. 20, 2013

(54) OIL-BASED INK JET INKS

(75) Inventors: Thomas Anthony, Sunnyvale, CA (US);
Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 12/975,101

(22) Filed: Dec. 21, 2010

(65) Prior Publication Data

US 2012/0154480 A1    Jun. 21, 2012

(51) Int. Cl.
*B41J 2/01*    (2006.01)

(52) U.S. Cl.
USPC .............................. 347/100; 347/95; 523/160

(58) Field of Classification Search
USPC ................. 347/100, 95, 96, 101, 88, 103, 99, 347/102, 21, 20, 9; 106/31.6, 31.27, 31.13; 523/160, 161
See application file for complete search history.

(56) References Cited

U.S. PATENT DOCUMENTS

| | | | |
|---|---|---|---|
| 5,814,683 A | 9/1998 | Branham | |
| 6,048,389 A | 4/2000 | Price et al. | |
| 6,302,537 B1 * | 10/2001 | Kato | 347/100 |
| 6,790,268 B2 | 9/2004 | Lee et al. | |
| 7,434,899 B2 | 10/2008 | Nakajima | |
| 2001/0055047 A1 * | 12/2001 | Ohsawa et al. | 347/103 |
| 2003/0225188 A1 * | 12/2003 | Horie | 523/160 |
| 2004/0011248 A1 * | 1/2004 | Taguchi et al. | 106/31.28 |
| 2007/0276060 A1 | 11/2007 | Stancik et al. | |
| 2009/0312463 A1 * | 12/2009 | Bernaerts et al. | 524/89 |

FOREIGN PATENT DOCUMENTS

| | | |
|---|---|---|
| JP | 2003292839 | 10/2003 |
| JP | 2009265158 | 11/2009 |
| WO | WO2007136382 | 11/2007 |

* cited by examiner

*Primary Examiner* — Manish S Shah

(57) ABSTRACT

The present disclosure is drawn to an oil-based ink jet ink including a non-aqueous, oil-based liquid vehicle containing a charge control agent, the liquid vehicle having a conductivity of less than less than 50 pS/cm; from 3 wt % to 12 wt % of a pigment; from 0.5 wt % to 6 wt % of a dispersant; and from 0.001 wt % to 0.5 wt % of a high molecular weight polymer that is partially or fully solubilized in the liquid vehicle, and having a weight average molecular weight from 50,000 to 5,000,000 Mw, wherein ink jet ink has a conductivity of less than 1,000 pS/cm.

14 Claims, No Drawings

OIL-BASED INK JET INKS

BACKGROUND

Digital printing involves technologies in which a printed image is created directly from digital data, for example using an electronic layout and/or a desktop publishing program. Some known methods of digital printing include full-color ink jet printing, electrophotographic printing, laser printing, and thermal transfer printing methods.

Regarding ink jet printing or ink jet transfer technologies, e.g., ink jet printing on an intermediate transfer medium, it is noted that certain types of inks upon ejection from an ink jet orifice often produce satellite droplets that can degrade print quality. For example, satellite droplets can land downstream or upstream from a primary drop and can be manifest on a print as multiple dots, dot expansion in the print direction (dot ellipticity), or background darkening. Furthermore, satellite droplets less than a micron in diameter (aerosol) can contaminate print engines.

Various attempts to reduce satellite droplets in various types of printing have been explored. Some methods have included reducing the drop velocity of the jetting ink, or decreasing the distance between the print head and substrate. However, these approaches have drawbacks, including magnification of drop placement errors caused by non-uniformities in drop velocity, trajectory, and airflow that are present among the thousands of nozzles that span a print bar, or increasing chances of print head damage due to contact wit print substrate. Alternatively, additives have been used to modify the surface tension and/or viscosity of inks. However, typically large amounts are added to make an appreciable difference, which can have a negative impact on image quality and ink adhesion. Active satellite removal using air jets or electrostatic forces also has challenges including increased cost and complexity, and does not adequately address the problems associated with long drop tails or large satellite drops.

DETAILED DESCRIPTION

Before the present disclosure is described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "solvent" refers to the fluid in which the colorant and the high molecular weight polymer of the present disclosure can be dispersed or dissolved to form an ink jet ink. Such a solvent can be a single solvent or a mixture of solvents. The liquid, including the solvent(s) and other liquids, used for the non-aqueous, oil based ink jet ink is often collectively referred to as a "liquid vehicle" herein. In some examples, the solvent(s) can also be admixed with a variety of different agents which are also part of the liquid vehicle, including without limitation, co-solvents, surfactants, charge control agents, buffers, biocides, viscosity modifiers, sequestering agents, stabilizing agents, anti-kogation agents, etc. In the context of the present disclosure, however, the "liquid vehicle" comprises all liquids that are present in the ink jet ink, except for the dispersant used to suspend the pigment and dissolved high molecular weight polymer.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

The term "non-aqueous" is defined as typically having no water present, but it is permissible that a non-aqueous composition contain residual amounts of water, e.g., up to 5 wt %.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

A plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

With this in mind, it has been recognized that satellite formation in oil-based ink jet inks can be reduced by adding a small amount of high molecular weight polymer (HMWP) to the ink jet ink. In accordance with this, the present disclosure is drawn to an oil-based ink jet ink comprising a non-aqueous, oil-based liquid vehicle having a conductivity of less than less than 50 picosiemens/centimeter (hereinafter "pS/cm"); from 3 wt % to 12 wt % of a pigment; from 0.5 wt % to 6 wt % of a dispersant; and from 0.001 wt % to 0.5 wt % of a high molecular weight polymer that is partially or fully solubilized in the liquid vehicle, and which has a weight average molecular weight range from 50,000 Mw to 5,000,000 Mw.

In a related example, a method of printing can comprise jetting the oil-based ink jet ink described above onto a substrate. In one specific example, the substrate can be an intermediate transfer medium positioned to receive the ink jet ink from the print head, and can be configured to evaporate solvent from the ink jet ink followed by transferring pigment from the intermediate transfer medium to a printing substrate.

In another example, a printing system can comprise the oil-based ink jet ink described above; an ink reservoir containing the oil-based ink jet ink; and an ink jet print head in fluid communication with ink reservoir and configured to print the oil-based ink jet ink from 5 m/s to 12 m/s ink drop speed. In one specific example, the system is part of a printing system, comprising an intermediate transfer medium positioned to receive the oil-based ink jet ink from the print head. The intermediate transfer medium can also be configured to evaporate solvent from the oil-based ink jet ink followed by transferring pigment from the intermediate transfer medium to a printing substrate.

Thus, the present disclosure is drawn to oil-based ink jet ink compositions, systems, and methods. It is noted that when discussing the present ink jet inks, systems, and associated methods, each of these discussions can be considered applicable to each of these examples, whether or not they are explicitly discussed in the context of that example. For example, in discussing a solvent for use in an oil-based ink jet ink, such a solvent can also be used for a method of printing or a system for printing the oil-based ink jet ink, and vice versa.

Turning to specific reference to the non-aqueous, oil-based liquid vehicle, the present disclosure is particularly relevant to liquid vehicles that are dielectric or substantially dielectric, e.g., having a conductivity of no more than 50 pS/cm. The dielectric constant of the liquid vehicle is typically less than 3.5. In one example, the liquid vehicle can comprise, or even consist essentially of isoparaffins, such as or equivalent to the ISOPAR® high-purity isoparaffinic solvents with narrow boiling ranges marketed by Exxon Mobil Corporation (Fairfax, Va., USA). Exemplary ISOPAR® solvents that can be used include ISOPAR® L, ISOPAR® M, ISOPAR® V, ISOPAR® G, etc. Typically, with ISOPAR®, the higher the letter denoted, the higher the molecular weight. ISOPAR® solvents are suitable as isoparaffinic fluids because their conductivity is often very low, e.g., less than 1 pS/cm.

Other suitable solvents or cosolvents for implementing examples of the present disclosure include alkanes having from about 6 to about 14 carbon atoms such as solvents sold under the NORPAR® (NORPAR® 12, 13 and 15) tradename available from Exxon Mobil Corporation (Fairfax, Va., USA). Hydrocarbons that can be used are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK).

In accordance with examples of the present disclosure, the liquid vehicle as a whole, regardless of what is present therein, has a conductivity that can be as high as 10 pS/cm or even 50 pS/cm, but should be kept very low. As mentioned above, ISOPAR® solvents are good candidates because they often have a conductivity that is below 1 pS/cm, and if other solvents are added with higher conductivity, the liquid vehicle as a whole can be kept below 50 pS/cm or even 10 pS/cm.

When considering solvents for the non-aqueous, oil-based liquid vehicle, oils or solvents having low conductivity, and which are essentially non-polar solvents, can be used. Molecular weight can also be considered in selecting solvents, as higher molecular weight solvents tend to have lower vapor pressures, which makes them more difficult to evaporate off of an intermediate transfer medium or other substrate. Thus, in one example, ISOPAR® L is a good candidate for applications where ink jet inks are used to print on intermediate transfer mediums. ISOPAR® L has a boiling point on the order of about 200° C., and can be pulled off of the intermediate transfer medium fairly efficiently at a temperature of about 100° C. Low boiling point, low molecular weight oils generally have low viscosity. For example, the viscosity of Isopar L is 1.2 cP, and inks made using an Isopar L vehicle typically have viscosity less than 4 cP. Jetting liquids with viscosity less than 4 cP is challenging since most ink jet heads are optimized for higher viscosity and satellite formation becomes more prevalent as viscosity is decreased. In the context of one specific embodiment, the non-aqueous, oil-based liquid vehicle can have a vapor pressure greater than 2 Torr at a temperature of 100 degrees centigrade.

In the context of the present disclosure, the non-aqueous, oil-based liquid vehicle comprises all liquids that are present in the ink jet ink, except for the dispersant present to suspend the pigment and the dissolved high molecular weight polymer additive that is used to reduce satellite droplets. In accordance with this, more generally, the oil-based ink jet inks can include aliphatic solvent or combination of solvents including substituted or unsubstituted, linear or branched compounds, provided the liquid vehicle as a whole has a low conductivity, e.g., less than 50 pS/cm and typically less than 10 pS/cm. In one example, the non-aqueous, oil-based liquid vehicle can include a single oil or solvent, or alternatively, can be a combination of solvents that is nonaqueous, e.g., containing from 0 wt % to 0.5 wt % water.

Referring now to the high molecular weight polymer additive, this additive is typically dissolved in the non-aqueous, oil-based liquid vehicle, but is not considered to be part of the liquid vehicle. As mentioned, the high molecular weight polymer can be present as dissolved polymer based on a percentage of the total ink weight from 0.001 wt % to 0.5 wt %, and can have a weight average molecular weight range from 50,000 Mw to 5,000,000 Mw. The additive present within this concentration range and molecular weight range can provide a moderate to dramatic improvement in reducing satellite drops when printing at relatively high drop velocities, e.g., from 5 m/s to 12 m/s. However, within these ranges, typically, when the polymer has a higher molecular weight, a lower concentration of additive may be used. For example, in one embodiment, using a 100,000 Mw polymer, closer to 0.5 wt % of additive may be used to maximize the reduction of satellite drops, though lesser amounts would also have a positive impact on satellite drop reduction. Alternatively, if a higher molecular weight of 1,000,000 Mw is used, it may be that 0.01 wt % produces acceptable reduction in satellites. Furthermore, jetting would be difficult from a typical ink jet print head at higher molecular weights, e.g., 1,000,000 Mw or greater, for concentration closer to 0.5 wt %.

In some examples, use of the additive within narrower ranges of concentrations and molecular weight can be considered for certain applications. For example, in one example, the high molecular weight polymer can be present as dissolved polymer within the ink at from 0.003 wt % to 0.1 wt %. In another example, the high molecular weight polymer can have a molecular weight range from 200,000 Mw to 1,000,000 Mw.

In one specific example, to determine whether there is in fact a reduction in satellite drops for a given ink, an ink with a high molecular weight polymer additive can be compared to an identical ink with the exception that it is devoid of the additive. One specific test that can be conducted would be to jet 10 pL drops of the ink jet inks at 2 kHz and at relative drop velocities of 8-9 m/s for comparison purposes. Often, the ink with the additive at an appropriate concentration as described herein will not generate satellite drops (or exhibit a reduction in satellite drops), whereas a comparative ink without the additive may continue to generate undesirable satellite drops.

This specific jetting example is not intended to be limiting, but provides an acceptable test to determine if satellite drops are reduced by the addition of the high molecular weight polymers described herein.

Polyolefins and polyacrylates are examples of polymer types that can be used to suppress satellites. Specific examples of polyolefins include polyisobutylene (PIB), polyethylene, polybutadiene, ethylene-propylene rubber, and mixtures thereof. Specific examples of polyacrylates that can be used include polyacrlylic acid, polymethacrylic acid, polymethyl methacrylcate, and polybutyl acrylate. In one example, the solubility of the polymer additive can be sufficient to yield dissolved concentration in the range of 0.001 wt %<high molecular weight polymer<0.5 wt %. It is noted that certain polymers with limited solubility in the carrier fluid may still satisfy this equation.

Turning now to the pigment and pigment dispersant, it is understood that the pigment and the dispersant are often two separate components added to the ink jet ink, the dispersant composition and concentration being such that it effectively suspends the pigment in the ink jet ink. That being said, however, pigment dispersed using surface attached or surface adsorbed dispersing agents can also be used.

Referring specifically to the pigment, it can be present in the oil-based ink jet inks at from about 3 wt % to about 12 wt %. In one example, the pigment can be present from about 4 wt % to about 7 wt % of the ink. Any pigment suitable for ink jet ink application can be used, including, but not limited to black pigments, cyan pigments, magenta, yellow pigments, white pigments, and combinations thereof. Generally, the pigments can be of any variety of pigment known to be useful in the ink jet and electrophotographic printing fields. Non-limiting examples of pigments that can be used include pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3G, CROMOPHTHAL® YELLOW GR, CROMOPHTHAL® YELLOW 8G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 6901 F, HELIOGEN® BLUE TBD 7010, HELIOGEN® BLUE K 7090, HELIOGEN® BLUE L 7101F, HELIOGEN® BLUE L 6470, HELIOGEN® GREEN K 8683, HELIOGEN®GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; pigments by Paul Uhlich including UHLICH®BK 8200, and Clariant Pigments, such as Clariant Toner Magenta 6B pigment.

As mentioned, the pigment dispersant can be used to disperse and suspend the pigment in the ink jet ink. More particularly, dispersant is added to the formulation to provide for the pigment particles remaining deagglomerated in ink jet ink. Dispersant interacts with the pigment surface in a manner that prevents pigment particles from adhering to one another when coming into contact. In one example, dispersant may be selected from ionic surfactant(s) and/or a non-ionic surfactant(s), and these surfactants are chosen to be soluble in the non-polar, oil-based carrier (e.g., ISOPAR® L or other solvent or solvent mixture). Some examples of suitable ionic dispersants that are soluble in non-aqueous carriers include dioctyl sodium sulfosuccinate, the ionic surfactants of the TERGITOL® GR series (The Dow Chemical Co., Midland, Mich.), cetyltrimethyl ammonium salts, polyamines with cationic character (such as SOLSPERSE® 19000 or 21000, Lubrizol Corp., Wickliffe, Ohio), or combinations thereof. Examples of non-ionic dispersants that are soluble in non-polar carriers include homopolymers or co-polymers of polyimine, polyisobutylene, secondary alcohol ethoxylates, polystearate, polyesters, polyethers, polyamines, polyacrylates, polyhaloalkanes, silicone polymers, alkanes, non-ionic polyamines (such as SOLSPERSE® 11200, Lubrizol Corp.), or combinations thereof. In one example, one or both of LUBRIZOL 2155 and/or SOLSPERSE® 21000 can be used.

Inks with pigment dispersants create more conductivity compared to the liquid vehicles of the present disclosure. Thus, though the non-aqueous, oil-based liquid vehicle will typically have a very low conductivity, the ink jet ink as a whole will necessarily have a higher conductivity. When the pigment and dispersant are added, the conductivity can still be kept below about 1,000 pS/cm, and often less than 500 pS/cm of conductivity.

Though the ink jet ink can be used for direct printing on a media substrate, in one particular example, the ink jet ink can be printed on an intermediate transfer medium, such as a blanket or polymer coated blanket, and then exposed to a corona discharge (charging the pigment). The essentially non-conductive liquid vehicle provides a good environment for the pigment to retain charge, allowing it to be pinned to a grounded polymer coated blanket.

Regarding the jetting aspects of the ink jet printing system, as mentioned, the high molecular weight polymer, dissolved in the liquid vehicle, provides acceptable reduction in satellite drops when printed at high drop velocities. Specifically, this improvement was shown on two Dimatix piezoelectric ink jet heads (FUJIFILM DIMATIX®, Inc. 2250 Martin Avenue Santa Clara, Calif.), namely the DIMATIX® Materials Printer head, and DIMATIX® Q-class Print head. Both heads produce a nominal drop size of 10 pL and have nozzles spaced 254 µm apart. The DMP head is a silicon MEMS design with 16 nozzles, whereas the Q-class is a composite design with 256 nozzles. in one example, optimal fluid viscosity can be about 10-12 cP for both heads, though this is not required. With both of these print heads, reduction of satellite drops can be demonstrated by adding the high molecular weight polymer additives described herein.

Oil-based inkjet inks that do not include high molecular weight polymer additive exhibit two deleterious phenomena. First, at higher velocities, e.g., greater than 8 m/s, the tail becomes highly elongated and breaks up into multiple trailing satellite drops. Second, a pre-drop or leading satellite drop precedes the primary drop over a broad velocity range (~3 to 12 m/s). Both leading drops (small satellite drops that travel ahead of the main drop body) and trailing drops (small satellite drops that follow the main drop body) can be a problem with respect to print accuracy. Tail volume can also be detrimental to print quality, as the tail will either break off, forming a trailing satellite drop or multiple satellite drops, or will remain intact as a tail at impact, reducing the accuracy of the dot printed by the ink drop.

The addition of high molecular weight polymer to the liquid vehicle within the prescribed concentration and molecular weight ranges can reduce or eliminate satellite formation. Many concentrations that are effective in reducing satellites (0.01 wt %, for example) do not change the low shear viscosity of the ink vehicle, and thus, satellite reduction is not necessarily due to a change in low shear viscosity. Instead, the high molecular weight polymer additive imparts viscoelasticity to the ink vehicle, which inhibits the release of smaller satellites from the primary drop. Viscoelasticity leads to an increase in the range of drop velocities over which satellite free drop ejection can occur. First, ejection of the pre-drop satellite can be prevented. Second, tail break-off from the head of the drop can be impeded, reducing the number of satellites in the tail by promoting absorption of the drop tail into the primary drop. These improvements are particularly noticeable when jetting low viscosity oil-based inks, such as inks with an Isopar L liquid vehicle.

Print engine substrate speeds of 2 m/s are common in commercial printing systems, and speeds up to 5 m/s or even 10 m/s would be desirable for commercial printing applications. However, at these speeds substrate velocity is comparable to typical piezoelectric ink jet (PIJ) drop velocity, so satellites (leading drop or trailing drop) and fluid in the drop tail will be displaced downstream (or upstream in the case of leading drops) from the main drop by their respective distances from the main drop along the jetting direction. Satellites and drop tails in high speed print systems consequently can significantly degrade print quality. This problem can be mitigated or solved by introducing viscoelastic coupling throughout the ejected volume by the addition of a small amount of a soluble high molecular weight polymer additive.

The non-aqueous, oil-based ink jet inks of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. However, as noted above, these inks can be particularly adapted for ink jetting on to a blanket or polymer coated blanket, and then transferred to the ultimate recording media of choice. To illustrate, in one example, an electrical component can be present that electrostatically pins the pigment particles to the intermediate transfer medium prior to transferring to a printing substrate.

EXAMPLES

The following examples illustrate a number of embodiments of the present compositions, systems, and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present systems and methods. The appended claims are intended to cover such modifications and arrangements. Thus, while the present compositions and methods have been described above with particularity, the following examples provide further detail in connection with what are presently deemed to be the acceptable embodiments.

Example 1

Study of the efficacy of adding a soluble high molecular weight polymer to reduce satellite drops was carried out using dissolved polyisobutylene (PIB) in ISOPAR® L, which is an acceptable liquid vehicle for use in accordance with examples of the present disclosure. Three different PIB polymers (weight average molecular weight of 500,000 Mw, 1,000,000 Mw, and 4,200,000 Mw) were each dissolved in ISOPAR® L at various concentrations ranging from 0.001 w % to 1.0 wt %. Low shear viscosity measurements showed little or no change, e.g., up to 0.03 wt %, about 1.6 cP. The viscosity increased by 10-20% at 0.1 wt % and at 1 wt %, and the viscosity reached 5-10 cP. These solutions, along with pure ISOPAR® L, were jetted in the Dimatix Materials Printer (DMP) using 10 pL Piezo Ink Jet (PIJ) print heads operating at a frequency of 2 kHz and drop velocity of 8-9 m/s (typical PIJ voltage ~24 V). For PIB concentration greater than 0.1 wt %, the liquids did not jet effectively, particularly at the higher molecular weights. For PIB concentrations between 0.003 wt % and 0.03 wt %, characteristic satellite structure seen when jetting pure ISOPAR® L was eliminated. It is noted that a pigment and dispersant can be added to this liquid vehicle to form an ink jet ink in accordance with the present disclosure.

Example 2

Similar to that described in Example 1, varying concentrations of dissolved polyisobutylene (PIB) (400,000 Mw) was added to Isopar L. The formulations were then monitored for drop evolution with and LED strobe and video camera when jetting from a Q-class head (10 pL). Pure Isopar L showed a pre-drop or leading drop that ejected ahead of the primary drop, which would lead to print quality problems. However, at 0.01 wt % and at 0.025 wt %, no secondary pre-drop was formed. Thus, in this particular example, 400,000 Mw PIB at concentrations from 0.01 wt % to 0.025 wt % were found to remove satellite drops. It is noted that a pigment and dispersant can be added to these liquid vehicles to form ink jet inks in accordance with the present disclosure.

Example 3

A commercially available mixture of paraffin wax and polyolefin (Parafilm M®) was dissolved in ISOPAR® L by ultrasonic agitation at 50° C., cooled to room temperature, and filtered with a 1.0 μm syringe filter to remove remaining solids. Thermogravimetric analysis revealed that 2.6 wt % of Parafilm M® was dissolved in ISOPAR® L. Molecular weight of the dissolved additive was measured by gel permeation chromatography and was found to be 450,000 Mw. The solution was diluted to 0.01 wt % by adding ISOPAR® L and jetted from a DMP head (10 pL drop size) mounted in a Dimatix Materials Printer outfitted with a drop watching camera. Characteristic satellite structure seen when jetting pure ISOPAR® L was eliminated as a result of the added Parafilm M® when operating at a frequency of 2 kHz and drop velocity of 8-9 m/s (typical PIJ voltage ~24 V). It is noted that a pigment and dispersant can be added to this liquid vehicle to form an ink jet ink in accordance with the present disclosure.

Example 4

The 2.6 wt % Parafilm M® solution described in Example 3 was diluted in a mixture of one part ISOPAR® L and 9 parts ISOPAR® V to a concentration of 0.025 wt %. The solution was jetted from a Q-class head (10 pL) and drop evolution was monitored with an LED strobe and video camera. Characteristic satellite structure seen when jetting mixtures of ISOPAR® L and ISOPAR® V without the additive was eliminated when jetting with the additive at a frequency of 1 kHz, PIJ voltage of 50 V and temperature of 50° C. It is noted that a pigment and dispersant can be added to this liquid vehicle to form an ink jet ink in accordance with the present disclosure.

Example 5

Two magenta inks were prepared: one with a PIB additive and one without. The inks were prepared as follows: 4.6 wt % of Clariant Toner Magenta 6B pigment (pigment red 57:1) was dispersed in Isopar L with Solsperse 21000 at 10 wt % the pigment weight (0.46 wt %) and Lubrizol 2155 at 40 wt % the pigment weight (1.84 wt %). The ink was deagglomerated by milling in a Kotobuki UAM-015 bead mill for 40 minutes. The PIB with a molecular weight of 1,000,000 Mw was added to a first portion of the ink at a concentration of 0.01 wt % (Ink 1). A second portion was not further modified (Ink 2). Ink samples with and without PIB (Ink 2) were jetted from a DMP head (10 pL drop size) mounted in a Dimatix Materials Printer outfitted with a drop watching camera. Drop ejection was monitored by capturing video and still images from the nozzle plate to 1 mm away from the orifice. Jetting conditions were as follows: frequency at 2 kHz, pulse width at 5 µs, and temperature at 30° C. Piezo voltage was adjusted to get a drop velocity of 9.5 m/s (the voltage was 28V for Ink 2; 31V for Ink 1 with PIB additive). Images for Ink 2 (no additive) showed the tail breaking away from the primary drop at a distance of 0.4 mm from the nozzle plate and forming a smaller secondary drop linked to the remainder of the tail. When the primary drop was 1 mm from the nozzle plate the tail was still clearly evident. With Ink 1 (with PIB additive), the tail did not detach from the primary drop. Instead, at a distance of about 0.8 mm from the nozzle plate the tail began to be incorporated into the primary drop. By the time the drop reached 1 mm from the nozzle plate, a substantial fraction of the tail had been drawn into the primary drop.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An oil-based ink jet ink, comprising:
   a non-aqueous, oil-based liquid vehicle containing a charge control agent, the liquid vehicle having a conductivity of less than less than 50 pS/cm;
   from 3 wt % to 12 wt % of a pigment;
   from 0.5 wt % to 6 wt % of a dispersant or mixture of dispersants; and
   from 0.001 wt % to 0.5 wt % of a high molecular weight polymer that is partially or fully solubilized in the liquid vehicle, and having a weight average molecular weight from 50,000 to 5,000,000 Mw,
   wherein the ink jet ink has a conductivity of less than 1,000 pS/cm.

2. The oil-based ink jet ink of claim 1, wherein the high molecular weight polymer is present at from 0.003 wt % to 0.1 wt %, and has a weight average molecular weight range from 200,000 Mw to 1,000,000 Mw.

3. The oil-based ink jet ink of claim 1, wherein the high molecular weight polymer is a polyolefin or a polyacrylate.

4. The oil-based ink jet ink of claim 1, wherein the high molecular weight polymer is polyisobutylene.

5. The oil-based ink jet ink of claim 1, wherein the liquid vehicle has a conductivity of less than 10 pS/cm.

6. The oil-based ink jet ink of claim 1, wherein the non-aqueous, oil-based liquid vehicle has a vapor pressure greater than 2 Torr at a temperature of 100 degrees centigrade.

7. The oil-based ink jet ink of claim 1, wherein the non-aqueous, oil-based liquid vehicle includes an isoparaffin oil at more than 50 wt % of the liquid vehicle content.

8. The oil-based ink jet ink of claim 1, wherein when a 10 pL drop of the ink jet ink is jetted at 2 kHz and at a drop velocity of 8-9 m/s, the ink jet ink exhibits a reduction in satellite drops compared to an otherwise identical ink jet ink devoid of the high molecular weight polymer.

9. A method of printing, comprising jetting the oil-based ink jet ink of claim 1 onto a substrate.

10. The method of claim 9, wherein the substrate is an intermediate transfer medium positioned to receive the ink jet ink from the print head, and configured to evaporate solvent from the ink jet ink followed by transferring pigment from the intermediate transfer medium to a printing substrate.

11. A printing system, comprising:
    an oil-based ink jet ink, comprising a non-aqueous, oil-based liquid vehicle containing a charge control agent, the liquid vehicle having a conductivity of less than less than 50 pS/cm; from 3 wt % to 12 wt % of a pigment; from 0.5 wt % to 6 wt % of a dispersant; and from 0.001 wt % to 0.5 wt % of a high molecular weight polymer that is partially or fully solubilized in the liquid vehicle, and having a weight average molecular weight from 50,000 to 5,000,000 Mw, wherein the ink jet ink has a conductivity below 1,000 pS/cm;
    an ink reservoir containing the oil-based ink jet ink; and
    an ink jet print head in fluid communication with ink reservoir and configured to print the ink jet ink at from 5 m/s to 12 m/s.

12. The printing system of claim 11, wherein the non-aqueous, oil-based liquid vehicle has a vapor pressure greater than 2 Torr at 100 degrees centigrade, and wherein the ink jet ink is formulated so that when printed at from 5 m/s to 12 m/s, satellite drops are substantially eliminated.

13. The printing system of claim 11, further comprising an intermediate transfer medium positioned to receive the ink jet ink from the print head, and configured to evaporate solvent from the ink jet ink followed by transferring pigment from the intermediate transfer medium to a printing substrate.

14. The printing system of claim 13, further comprising an electrical component that electrostatically pins the pigment particles to the intermediate transfer medium prior to transferring to a printing substrate.

* * * * *

UNITED STATES PATENT AND TRADEMARK OFFICE
CERTIFICATE OF CORRECTION

PATENT NO.        : 8,511,813 B2
APPLICATION NO.   : 12/975101
DATED             : August 20, 2013
INVENTOR(S)       : Thomas Anthony et al.

Page 1 of 1

It is certified that error appears in the above-identified patent and that said Letters Patent is hereby corrected as shown below:

In the Specifications

In column 9, line 53, in Claim 1, delete "less than less than" and insert -- less than --, therefor.

In the Claims

In column 10, line 20, in Claim 8, delete "8- 9 m/s," and insert -- 8-9 m/s, --, therefor.

In column 10, lines 33-34, in Claim 11, delete "less than less than" and insert -- less than --, therefor.

Signed and Sealed this
Twenty-fourth Day of December, 2013

Margaret A. Focarino
*Commissioner for Patents of the United States Patent and Trademark Office*